United States Patent [19]
Kinsey

[11] Patent Number: 5,612,702
[45] Date of Patent: Mar. 18, 1997

[54] DUAL-PLANE MONOPULSE ANTENNA

[75] Inventor: Richard R. Kinsey, Dewitt, N.Y.

[73] Assignee: Sensis Corporation, Dewitt, N.Y.

[21] Appl. No.: 621,698

[22] Filed: Mar. 26, 1996

Related U.S. Application Data

[63] Continuation of Ser. No. 223,524, Apr. 5, 1994, abandoned.

[51] Int. Cl.$^6$ .............................. G01S 5/02; G01S 13/00
[52] U.S. Cl. ........................... 342/427; 342/149; 342/153
[58] Field of Search ................................. 342/427, 153, 342/154, 158, 149, 152

[56] References Cited

U.S. PATENT DOCUMENTS

| | | |
|---|---|---|
| 2,946,997 | 7/1960 | Horner . |
| 3,430,247 | 2/1969 | Wong . |
| 3,526,898 | 9/1970 | Plunk et al. . |
| 3,636,563 | 1/1972 | Laverick et al. . |
| 4,164,742 | 8/1979 | Nemit . |
| 4,568,940 | 2/1986 | Diamond ................................. 342/149 |
| 4,958,166 | 9/1990 | Branigan et al. . |
| 4,983,977 | 1/1991 | Hrycak ................................... 342/153 |
| 5,066,956 | 11/1991 | Martin .................................... 342/154 |

Primary Examiner—Gregory C. Issing
Attorney, Agent, or Firm—Harris Beach & Wilcox, LLP

[57] ABSTRACT

A planar edge-slotted and end-fed traveling wave antenna is designed for monopulse operation, with an odd array of parallel elements interleaved with an even array of parallel elements. The even elements have an amplitude taper that is an arithmetic sum of Taylor and Bayliss amplitude tapers, while the odd elements have an amplitude taper that is an arithmetic difference of the Taylor and Bayliss tapers. Transmit energy is fed to both the odd and even elements, and the resulting radiation produces a pencil beam of a predetermined beamwidth for illumination of a distant target. The return excitation for the odd and even elements is combined to produce sum and difference monopulse patterns.

20 Claims, 6 Drawing Sheets

DUAL-PLANE MONOPULSE ANTENNA

This is a Continuation of application Ser. No. 08/223,524 filed Apr. 5, 1994, now abandoned.

BACKGROUND OF THE INVENTION

The present invention relates to planar slotted-waveguide antennas, of the type employed in radar.

For surface-based radars, especially those operating in the frequency range of 1–20 GHz, both reflector antennas and planar arrays with electronic scanning can be used for a variety of radar applications.

Reflector antennas have advantages of low cost and light weight but are basically limited in application to either a 2D surveillance mode (range and angle in the axis of rotation) or as dedicated single target trackers. Fully electronically scanned array antennas can provide the beam agility required for multimode operation throughout a quadrant of hemispherical space, but are relatively heavy and extremely expensive.

Midway between the above two approaches in the cost/capability range is a planar array with a stack of beams or with electronic scanning in one dimension. This often takes the form of a planar array of parallel slotted waveguide elements. Mechanical rotation provides scanning in either the azimuth or elevation plane with phase shifters and/or frequency changes to steer the beam electronically in the other plane, i.e., elevation or azimuth. The usual antenna implementation provides a pencil beam in the plane of the waveguide elements rather than monopulse. Although this type of antenna offers advantages of light weight, low cost and good maintainability, relative to a fully phased array, target location in the plane of the waveguide elements requires beam splitting by using the sequence of radar returns as the antenna beam rotates through the target position. This technique is less accurate than monopulse and more susceptible to electronic counter-measures (ECM). Furthermore, the need for multiple hits on each target to determine its location, as compared to monopulse which may require only a single return, curtails its "track-while-scan" applicability in a dense target environment. It is also not suited to dedicated tracking antennas that may combine electronic beam steering in one plane with mechanical slewing in the other to track multiple targets within some region of space.

Prior techniques for providing monopulse with edge-slotted waveguide antennas have usually involved a pair of pencil beams overlapped in angle and combined in a hybrid tee to obtain sum and difference outputs, e.g. Branigan et al. U.S. Pat. No. 4,958,166 and Wong. U.S. Pat. No. 3,430,247. However, practical problems of packaging the closely spaced sticks and obtaining acceptable monopulse patterns appear to have largely curtailed their application.

The monopulse principle involves radiating a pencil beam to illuminate a distant target, and then separately receiving and processing a sum return signal and a difference return signal. A pair of overlapping pencil beams can be generated in interleaved arrays or in slotted waveguides that operate in either of two different modes of excitation, with separate hybrid ports being provided for each mode. This is described in U.S. Pat. No. 4,164,742. However, the overlapping pencil beams there described achieve rather poor monopulse performance, because of non-ideal excitation of the arrays. Also, any departure from the design RF frequency can cause variation in the angular overlap of the beams for the interleaved arrays, as changing the beam squint (off-broadside look angle). This can further degrade the sum pattern beam width and the difference pattern error slope.

Ideal monopulse sum and difference amplitude tapers can be expressed in terms of even and odd aperture field components, respectively about the center of the aperture. As a practical matter this may be achieved by interleaving two arrays of slotted waveguide elements, one array providing the sum excitation and the other array providing the difference excitation. In theory, either array could provide the even (sum) excitation with the other array providing the odd (difference) excitation. The field components that contribute to the monopulse sum and difference signals are thus separated in the array aperture itself rather than in monopulse beamforming networks located behind the array elements. This is described, e.g., in Laverick et al. U.S. Pat. No. 3,636,563.

In contrast to antenna systems that form the monopulse excitations from a pair of overlapped pencil beams, the beam squint or look angle for both the sum-and-difference interleaved arrays can be designed to be identical. This has the advantage that waveguide propagation velocity and slot spacing for both arrays is the same; as a consequence, the sum and difference patterns remain coincident with changes in RF frequency. This gives the antenna an inherent performance advantage.

Despite these advantages, the interleaved sum-and-difference approach to slotted array antenna does have shortcomings. For one thing, only one array of elements, i.e., the sum elements, can be used on transmit for target illumination. With phase shifters required at the input to each slotted waveguide element for beam steering in the orthogonal plane (stick-to-stick), the maximum array transmit power is thus limited to the combined power handling capability of only one-half the phase shifters.

OBJECTS AND SUMMARY OF THE INVENTION

Accordingly, it is an object of the present invention to employ a slotted array architecture that utilizes all phase shifters and all waveguide elements in forming the sum pattern, thereby doubling the allowable RF transmit power for a given phase shifter capability.

It is a related object to produce a slotted waveguide array that produces low sidelobe dual-plane monopulse patterns with high gain factor and high error slope while retaining the weight and cost-advantages of conventional slotted waveguide arrays.

According to an aspect of this invention, a dual-plane monopulse planar array antenna is formed by stacking linear arrays in a parallel arrangement, with phase shifters at feed ports of the waveguide elements to carry out electronic scanning in the direction orthogonal to the elements. In a practical embodiment, the preferred transmission medium for the elements is rectangular waveguide, but other types of transmission medium could be used.

In the simplest embodiment, the linear arrays are arrays of end-fed, edge slotted traveling-wave type elements (sticks) that form two interleaved arrays; an odd array and an even array. The array of odd-numbered sticks has an excitation different from that of the even numbered sticks. The two excitations are combinations of independent sum and difference amplitude tapers. In a preferred embodiment, the amplitude taper for the even sticks is the arithmetic sum of amplitude tapers that would produce independent sum and difference patterns, while the amplitude taper for the odd sticks is the arithmetic difference of the sum and difference amplitude tapers. By hybrid-combining the outputs from the odd and even arrays, sum and difference patterns in the plane of the arrays are made available. These correspond to the sum and difference monopulse patterns that would have been obtained from traditional, independent sum and difference amplitude tapers. The sum beam gain and the difference pattern error slope are each realized without any additional loss due to the presence of the other interleaved array.

Preferably, the spacing between adjacent sticks in this interleaved array is one-half the spacing of a conventional array for a given beam scan requirement. This prevents the appearance of grating lobes, and keeps the energy concentrated in the forward sum and difference beams.

Energy is fed to both the even array elements and the odd array elements, and the radiation that emanates from the interleaved combined arrays produces a pencil beam of a predetermined beam width, and of a transmit strength that comes from both sets of sticks, rather than only from one set of sticks as in the prior art.

In a second embodiment, the odd and even sticks can be fed in relative quadrature, and in such case the sticks have amplitude tapers that combine to produce the transmit pencil beam when the energy fed to the odd sticks is shifted 90 degrees.

As mentioned previously, the antenna arrays are not limited only to slotted rectangular waveguide. For example, the principles of this invention could be used with stripline antennas or other antennas, depending on the application.

The above and many other objects, features, and advantages of this invention will become apparent from the ensuing description of a preferred embodiment which should be read in conjunction with the accompanying Drawing.

DESCRIPTION OF THE PREFERRED EMBODIMENTS

Figure 1:
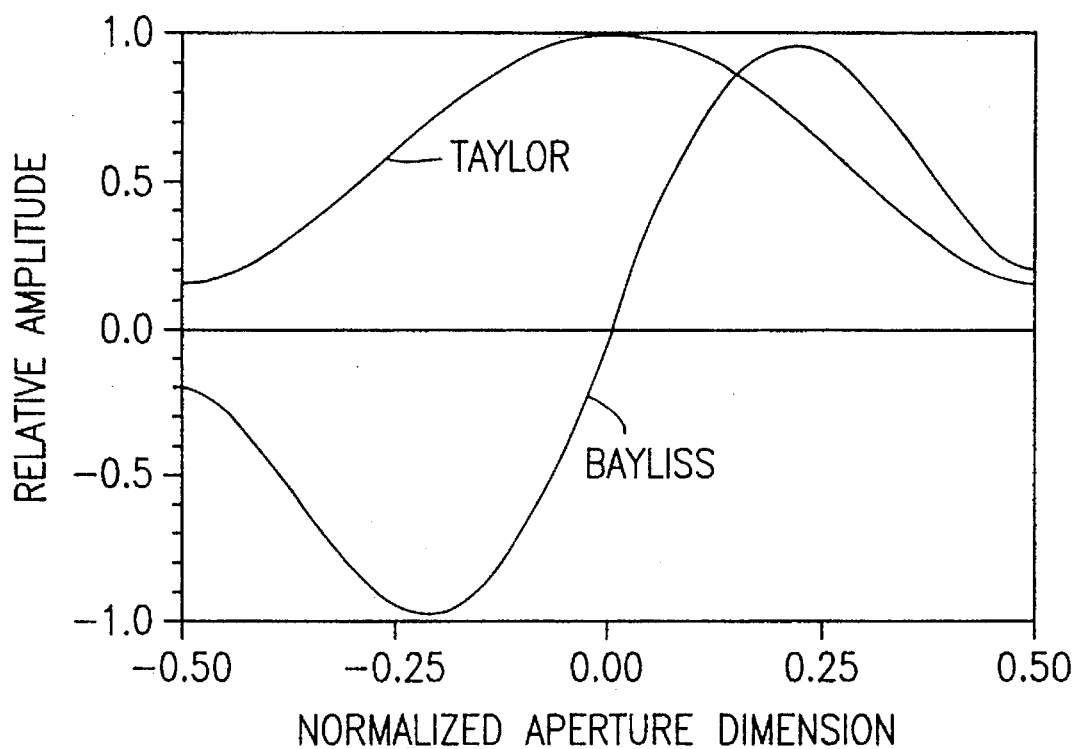
FIG. 1 is a chart showing graphs of Taylor and Bayliss amplitude tapers, as employed in conventional monopulse antennas.

With reference to the Drawing, and initially to FIG. 1, the principles of the present invention can be explained in terms of so-called Taylor and Bayliss amplitude tapers. The Taylor amplitude taper provides a high-gain, low-sidelobe pencil beam pattern well suited for a monopulse antenna sum beam. This is described in T. T. Taylor, "Design of Line-Source Antennas for Narrow Beamwidth and Low Side Lobes," IRE Transactions—Antennas and Propagation, pp. 16–28, January 1955. On the other hand, the Bayliss amplitude taper provides a pattern well suited for a monopulse antenna difference beam. This is described in E. T. Bayliss, "Monopulse Difference Patterns with Low Sidelobes and Large Angle Sensitivity," BTL Memo MM-66-4131, Dec. 2, 1966. The Taylor and Bayliss amplitude tapers can be used as the basis for the design of interleaved array excitations, and can be combined as described below to utilize all the linear elements and their associated phase shifters to form the transmit beam. The linear arrays with the combined Taylor-Bayliss amplitude tapers when used to scan the return radiation will produce the desired sum and difference monopulse patterns.

The Taylor and Bayliss amplitude tapers as illustrated in FIG. 1 achieve sidelobe suppression of −35 dB.

For an end-fed rectangular waveguide element, the amplitude taper is achieved by selecting the pattern of slots. The phase and amplitude at each set of slots depend on the slot tilt angle and on the position of the slots along the waveguide.

Figure 2:
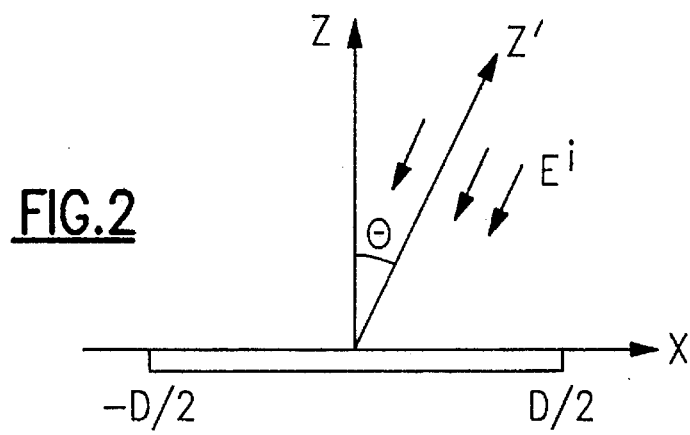
FIG. 2 is a schematic illustration of a uniform plane wave incident on a linear antenna aperture.

Referring now to FIG. 2, a plane wave incident on an antenna aperture can be mathematically expressed as follows:

$$E'=\exp(jkz')=\exp j(z\cos\theta + x\sin\theta) \quad (1)$$

where $k=2\pi/\lambda$, and the time variant $\exp(j\omega t)$ is suppressed.

Along the aperture plane ($z=0$), the incident plane wave can be considered as being composed of an even field component $E_E$ and an odd field component $E_o$ in phase quadrature with one another as expressed in equation (1). This reduces to $$E'_{z=o}=E_E+jE_o \quad (2)$$

where $E_E=\cos(kx\sin\theta)$ and $E_o=\sin(kx\sin\theta)$.

Here $x$ can be normalized for the aperture length D so that $x$ is confined between $-\frac{1}{2} \leq x \leq \frac{1}{2}$, and a parameter $u$ is defined $u=D/\lambda \sin\theta$. This parameter $u$ is substituted into equation (2) to yield:

$$E_E=\cos(2\pi ux) \quad (3)$$

$$E_o=\sin(2\pi ux) \quad (4)$$

Now, if the excitation over the aperture length is a function $f(x)$, the expressions for Taylor and Bayliss amplitude tapers as shown in FIG. 1 can be expressed in the same functional form as odd and even field components in equations (3) and (4). Here the integer $\bar{n}$ defines a region of controlled pattern sidelobes. The sum and difference excitations can then be expressed:

$$f_\Sigma(x) = \sum_{i=1}^{n} A_i \cos(2\pi u_i x) \text{ - (Taylor)} \quad (5)$$

where $u_i = i - 1$, and $-\frac{1}{2} \leq x \leq \frac{1}{2}$;

$$f_\Delta(x) = \sum_{i=1}^{n} B_i \sin(2\pi u_i x) \text{ - (Bayliss)} \qquad (6)$$

where $u_i = i + \frac{1}{2}$, and $-\frac{1}{2} \leq x < \frac{1}{2}$.

The field component $E_E$ of equation (3) couples only with the sum excitation $f_\Sigma(x)$ of equation (5), while the field component $E_o$ of equation (4) couples only with the difference excitation $f_\Delta(x)$ of equation (6). For this reason, it has been conventional in the art to separate even and odd field components in the aperture in order to obtain the interleaved sum and difference excitations.

In a first embodiment of this invention, the sum excitation $f_\Sigma(x)$ is in phase quadrature with the difference excitation $f_\Delta(x)$. In this case, the array sum and difference outputs will be co-phasal or anti-phasal with respect to one another because of the quadrature relation of the odd and even field components, as in equation (2).

In a second embodiment, the excitations $f_\Sigma(x)$ and $f_\Delta(x)$ are both real, i.e. co-phasal or anti-phasal, the odd and even field components will produce outputs in phase quadrature for the same reason. In the terminology in common use in this field, the first case is referred to as "amplitude monopulse" and the second case as "phase monopulse." However, any array antenna with independent sum and difference excitations will produce the same monopulse sum gain and difference error slope, so the distinction between phase monopulse and amplitude monopulse loses any practical significance.

A primary objective of the present invention is to double the maximum radiated power capability of the antenna without increasing its size or complexity. This is done by utilizing both the interleaved odd and even arrays to form the transmit pencil beam, i.e., to form the sum pattern. This means all the sticks must couple to the odd field components and also to the even field components. If $f_o(x)$ is the excitation function for the array of odd-numbered sticks and $f_E(x)$ is the excitation function for the array of even numbered sticks, then there are two types of excitation that can be considered, and which can be expressed in canonical form as follows:

Type I excitation:

$$f_o(x) = f_\Sigma(x) - j f_\Delta(x) \qquad (7)$$

$$f_E(x) = f_\Sigma(x) + j f_\Delta(x) \qquad (8)$$

Type II excitation:

$$f_o(x) = f_\Sigma(x) - f_\Delta(x) \qquad (9)$$

$$f_E(x) = f_\Sigma(x) + f_\Delta(x) \qquad (10)$$

Here, if adjacent odd and even sticks are connected to a hybrid, the aperture excitation for the two sticks (one odd, one even) will be $f_\Sigma(x)$ at the hybrid sum port and either $j f_\Delta(x)$ or $f_\Delta(x)$ at the difference port, depending on whether the antenna is arranged for Type I or Type II excitation.

Figure 3:
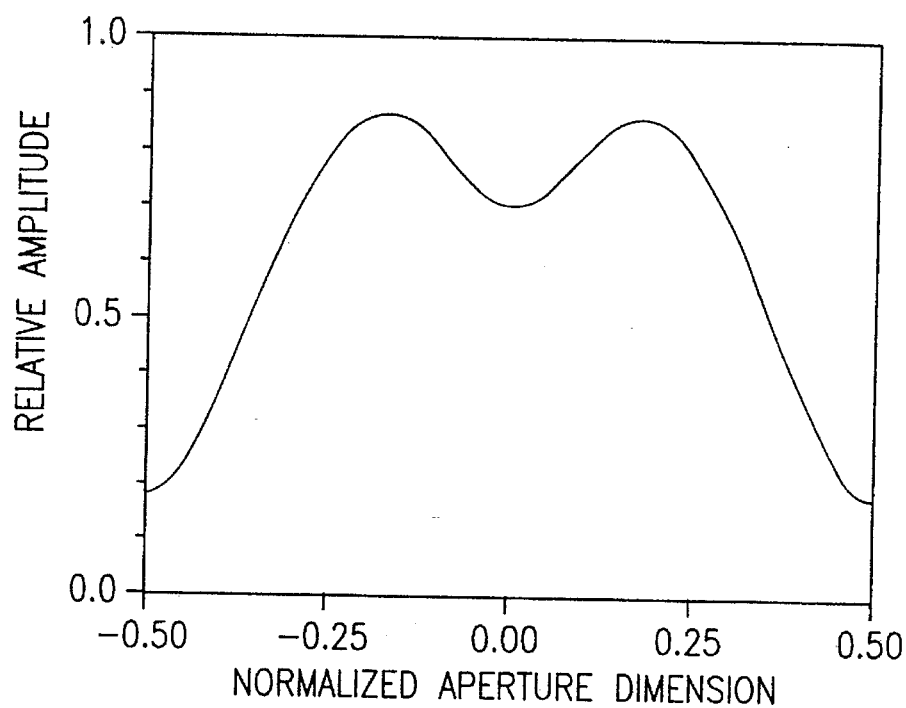
FIGS. 3 and 4 are charts of amplitude taper and phase taper, respectively, for odd and even array elements according to one embodiment of the invention.
Figure 4:
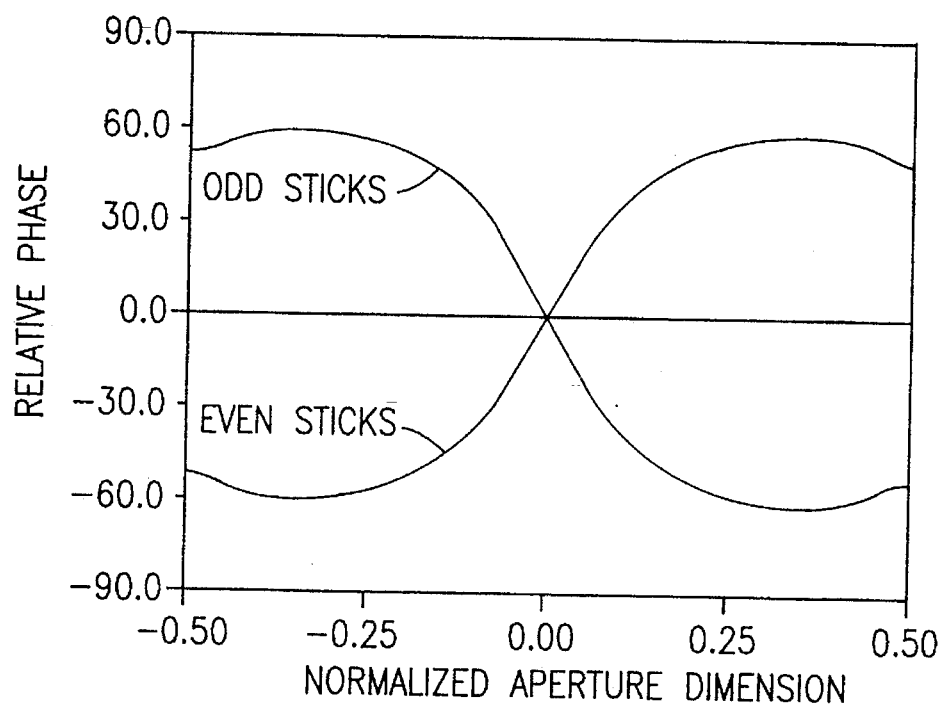
Figure 5:
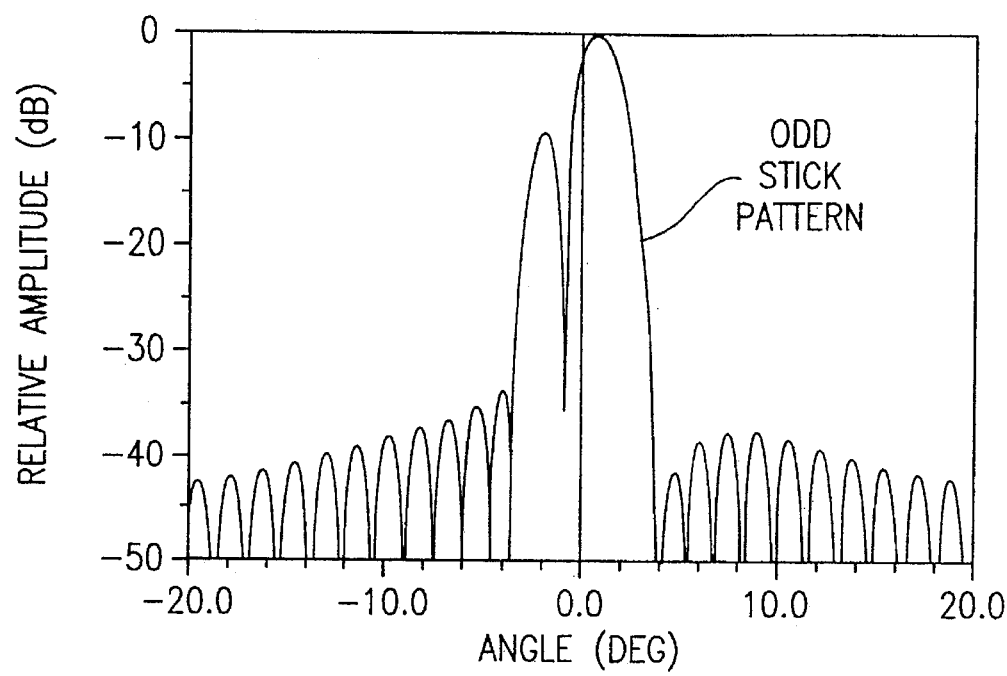
FIG. 5 is a graph of the odd stick pattern for the odd element array of this embodiment, with the even stick array being substantially a mirror image.
Figure 6:
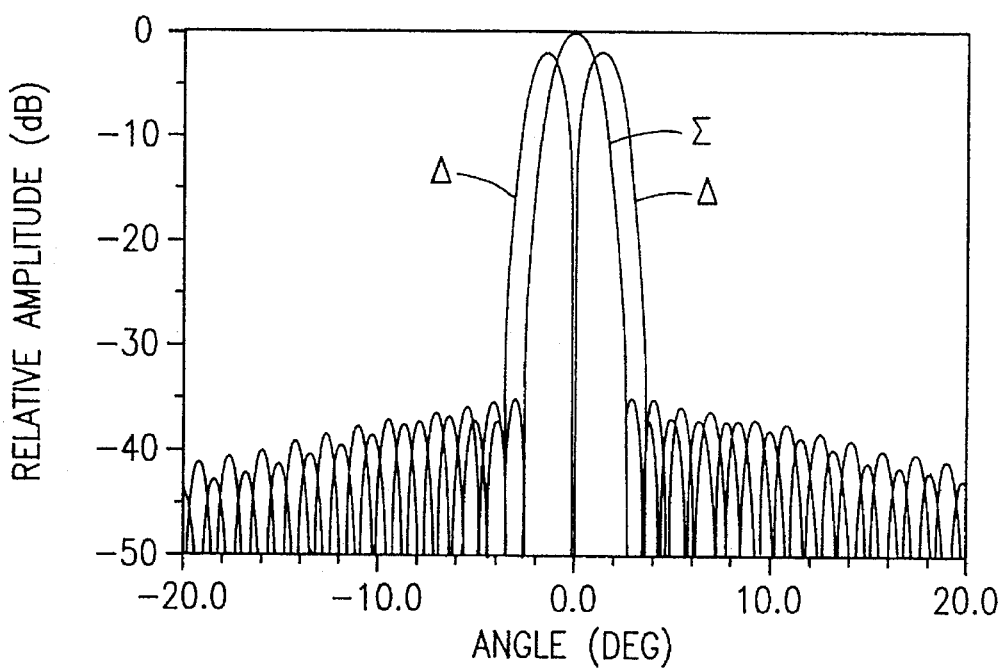
FIG. 6 is a graph of the sum or Taylor pattern and the difference or Bayliss pattern obtained by combining the signals received in the odd array and the even array of this embodiment.

In a first possible embodiment, Type I excitations are employed. The interleaved odd and even sticks have excitations $f_o(x)$ and $f_E(x)$ as expressed in equations (7) and (8). These excitation patterns are obtained by combining Taylor and Bayliss amplitude tapering, as in equations (5) and (6), for a $-35$ dB sidelobe level ($\bar{n}=5$). In this embodiment, the odd sticks have the same amplitude taper as the even sticks, as shown in FIG. 3, but an opposite phase characteristic, as shown in FIG. 4. In these charts the beam squint has been removed so that the phase derivations for the two linear array design are more clearly evident. The resulting far-field pattern from the odd-stick excitation is shown in FIG. 5. The even-stick excitation pattern is simply the mirror image of this, taken about the vertical axis through zero degrees. Then, when the odd and even stick ports are combined in a hybrid comparator, the output ports provide the sum and difference patterns $\Sigma$ and $\Delta$ as shown in FIG. 6. It should be recognized that the sum pattern $\Sigma$ in FIG. 6 corresponds to the pattern produced with the Taylor amplitude taper of FIG. 1, while the difference pattern $\Delta$ corresponds to the pattern produced by the Bayliss amplitude taper. The sum pattern $\Sigma$ has a gain factor or taper efficiency of 0.808 ($-0.93$ dB). By contrast, if a prior art antenna produces a monopulse by combining a pair of 35 dB Taylor patterns that are overlapped in angle to cross over at the $-3$ dB points, the combined sum pattern beam width broadens by about 35%, and the gain factor is reduced to about 0.563 ($-2.49$ dB).

The second embodiment of this invention employs Type II excitation. The antenna of the second embodiment has the theoretical advantages of the first embodiment, but enjoys additional advantages in its practical implementation. That is, since the odd and even excitations $f_o(x)$ and $f_E(x)$ given in equations (9) and (10) are the arithmetic sum and difference of Taylor and Bayliss amplitude tapers, the excitations are real (i.e. co-phasal and anti-phasal) rather then complex excitations.

Figure 7:
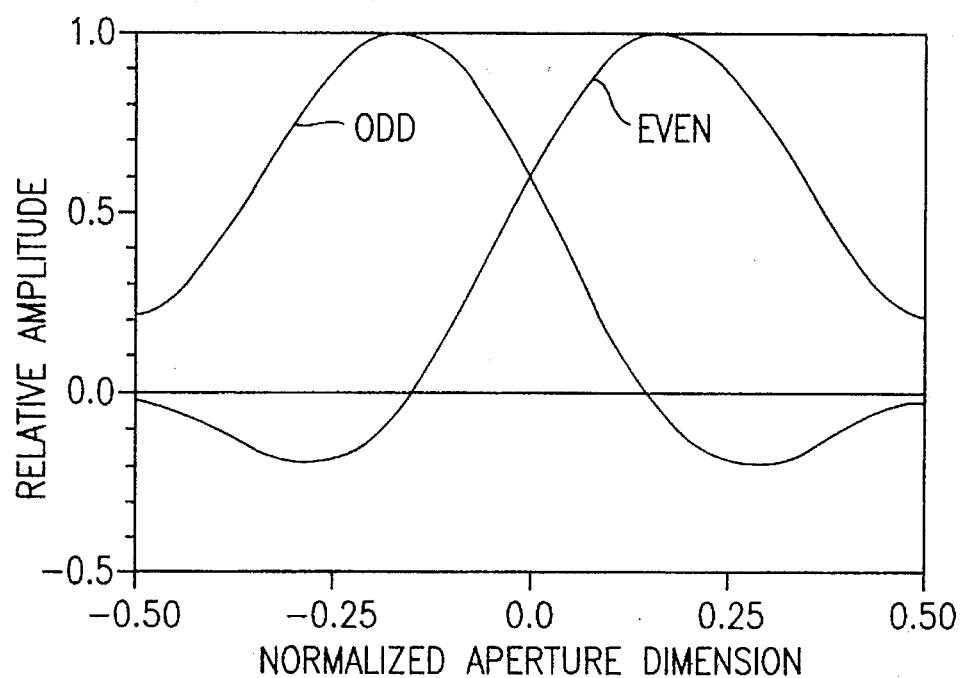
FIG. 7 is a chart of amplitude taper for the odd stick array elements and the even stick array elements of a second embodiment of this invention.

The amplitude tapers for the odd and even sticks are shown in the two graphs of FIG. 7. These produce the same $-35$ dB sidelobe characteristic as in the first embodiment.

Here, the amplitude of excitation for a waveguide edge slot is controlled by the angle of slot tilt. However, changing the tilt from a positive to a negative tilt, i.e., from a right tilt to a left tilt, introduces a 180-degree phase change to the excitation. Since the odd and even excitations $f_o(x)$ and $f_E(x)$ both enjoy the same linear beam squint, the slot spacing on each stick is uniform, and there is an additional 180-degree phase change at the point along the stick (or element) where the excitation crosses zero, which is accomplished by introducing a directional change to the slot tilt.

Combining the odd and even array outputs in a hybrid comparator produces the desired sum and difference output patterns of FIG. 6. As mentioned previously, since the odd and even excitations are both purely real, the sum and difference outputs will be in phase quadrature.

Figure 8:
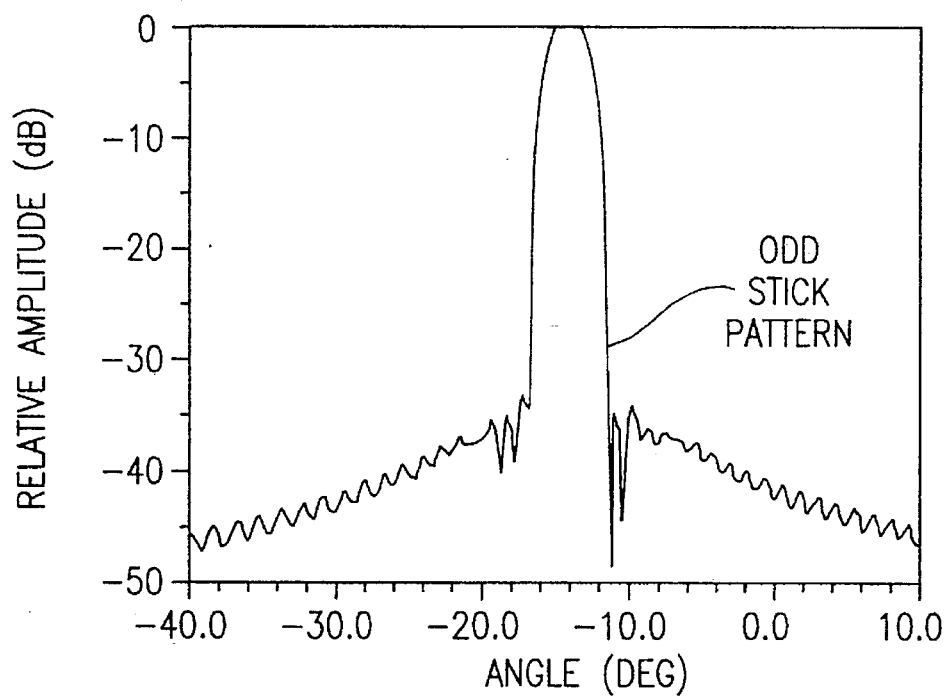
FIGS. 8 and 9 are graphs of far-field patterns for the odd stick array and the even stick array, respectively.
Figure 9:
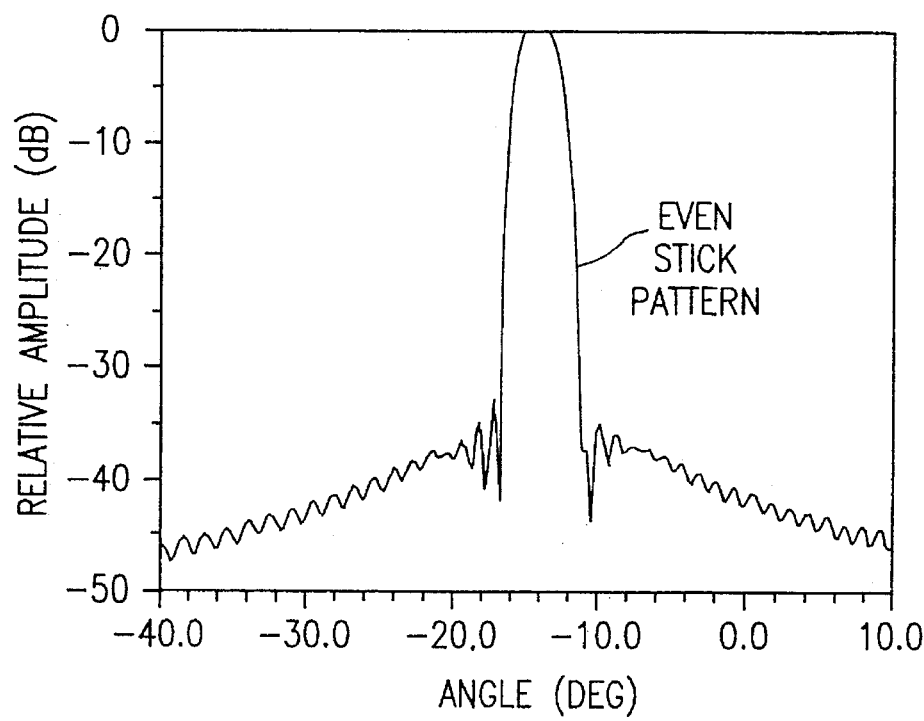
Figure 10:
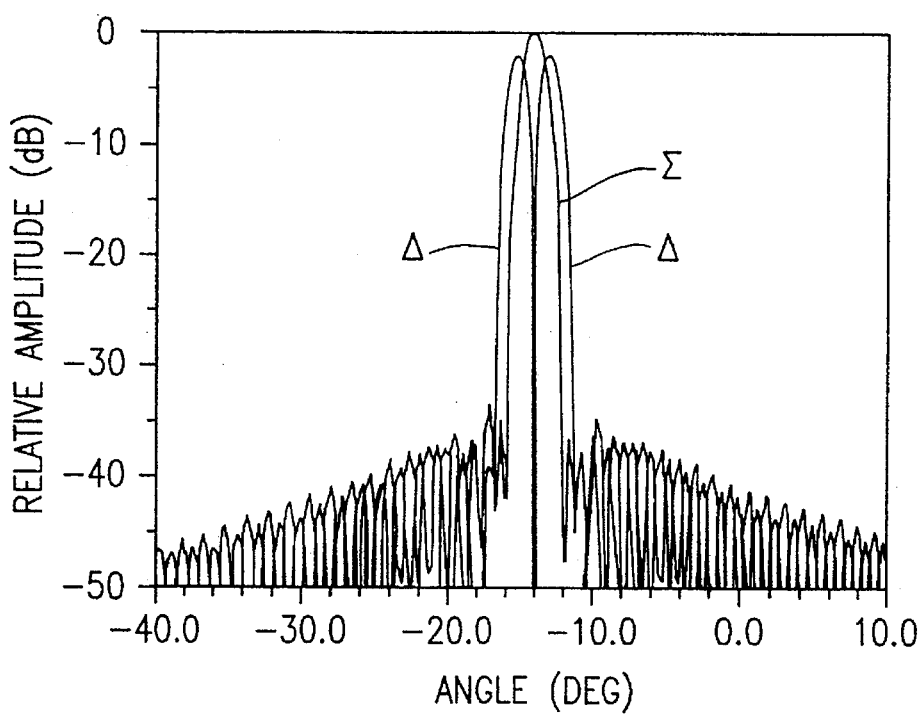
FIG. 10 is a graph showing monopulse for field sum and difference patterns for the interleaved array of this embodiment.

As an example of a practical implementation of this embodiment, an interleaved array of odd and even slotted waveguide elements was designed with $-35$ dB ($\bar{n}=5$) Taylor-Bayliss amplitude tapers, and these were sampled at slot positions to obtain $f_o(x)$ and $f_E(x)$ design excitations. This corresponds to the taper as illustrated in FIG. 7, except in this case the array has a finite squint or azimuth look angle. Other stick parameters are as follows:

Stick waveguide operation ratio $\lambda/\lambda_g = 0.707$,
   where $\lambda$ = free-space wavelenght
   $\lambda_g$ = waveguide wavelength
Slot spacing $s = 0.518\lambda$
Slots per stick $N = 90$
Stick dfficiency (including ohmic and load
   loss) $E = 92.5\%$
Theoretical beam squint $\theta$ = $\sin^{-1}(\lambda/\lambda_g - \lambda/2s)$
   = $-14°$ relative to true broadside Beam patterns for the odd and even sticks are as shown in the charts of FIG. 8 and FIG. 9, respectively. These are combined in the hybrid comparators to produce the monopulse sum pattern $\Sigma$ and difference pattern $\Delta$ as shown in FIG. 10. These patterns as here illustrated show the effects of the practical implementation, such as slot scattering on the array excitation. This was generally in the vicinity of ±1 degree of a linear phase squint. The monopulse pattern peak sidelobes, including excitation error effects are ±34 dB (sum) and −36.9 dB (difference). The error slope for this design comes to 0.0712 v/v/ms (volts of difference per volt of sum per millisine), which is very close to the value 0.0704 v/v/ms for theoretical Bayliss and Taylor patterns.

The frequency bandwidth that is available for good performance with a given array depends in large part on the quality or Q for the slots; the slot Q, in turn, is strongly affected by the array design. In the case of an array with sticks closely spaced for wide-angle scan capability, the mutual coupling effects can greatly reduce the slot Q. This can also make wide bandwidth feasible. In the embodiments of this invention, as mentioned previously, the stacks of the two interleaved arrays are preferably spaced closely adjacent one another, i.e., one-half the conventional spacing. This prevents grating lobes, and produces the desired characteristic of a wide performance bandwidth.

Figure 11:
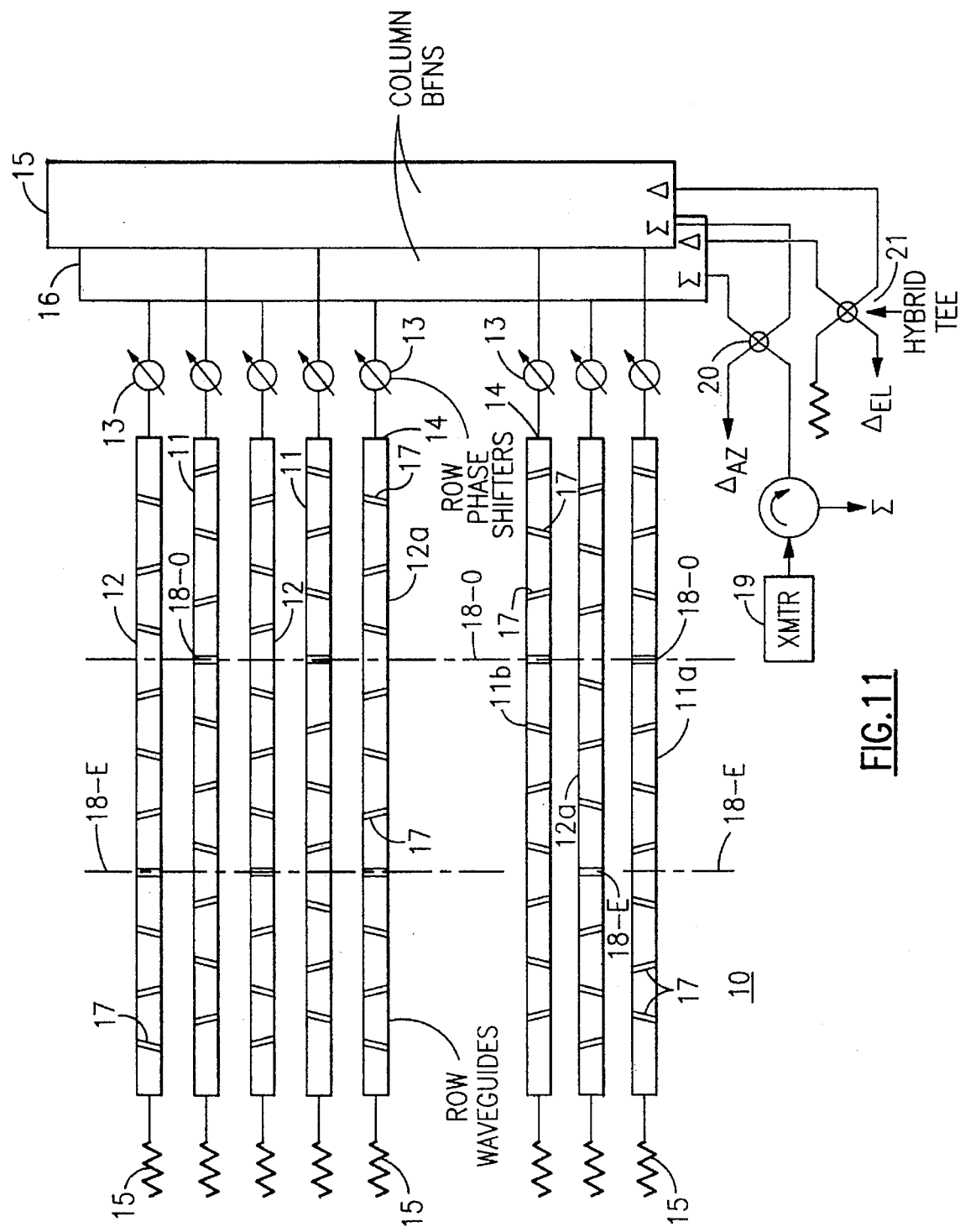
FIG. 11 is a schematic elevation of an end-fed traveling wave interleaved array antenna according to this embodiment.

A preferred architecture for this (i.e. second) embodiment is shown in schematic elevation in FIG. 11.

In this arrangement a radar antenna 10 is formed from a parallel array of odd sticks 11 interleaved with a parallel array of even sticks 12. The sticks in this antenna 10 are slotted rectangular waveguide elements which are end fed, with respective phase shifters 13 coupled to associated feed ports 14 at one end, and non-reflective terminations 15 situated at the far ends. In this version, the sticks or elements 11, 12 are arranged as horizontal members or rows, i.e. in the azimuthal direction, so that electronic beam steering is accomplished in elevation, i.e. in the plane normal to the sticks 11, 12. Of course, an antenna could as easily have the sticks oriented in the elevation direction, with electronic scanning in azimuth.

A pair of first and second column beamforming networks 15, 16 are respectively coupled to each of the phase shifters 13 for the respective sticks, one network 15 being associated with the odd sticks 11, and the other network 16 with the even sticks 12. These beamforming networks are monopulse networks that form $\Sigma$ and $\Delta$ signals in the plane orthogonal to the sticks.

The beamforming networks distribute transmit RF power to the respective sticks to radiate the pencil beam that illuminates a distant target, and then collect the return signal picked up by the sticks. The beamforming networks 15, 16 each have $\Sigma$ and $\Delta$ ports.

As shown here, each of the sticks 11, 12 has slots 17 cut at intervals in a waveguide edge that forms the front face. The amount of coupling to the slots depends on the amount of tilt, and the polarity of the excitation depends on whether the slots tilt one way or the other. In order to produce the combined Taylor-Bayliss amplitude taper. The slot angle alternates between a positive and a negative tilt from one slot 17 to the next along the stick; however, at a position 18-0 for the odd sticks and a position 18-E for the even sticks, there is a reversal in the sequence of slot tilt angles. This introduces the 180 degree phase change at the zero crossings shown in the chart of FIG. 7.

A transmitter 19 provides monopulse RF energy to the $\Sigma$ ports of each of the networks 15, 16 so that each of the sticks 11, 12 participates in generating the illumination pencil beam.

The $\Sigma$ ports of the two interleaved array beamforming networks are coupled to a first hybrid tee 20, and this tee produces a monopulse sum output $\Sigma$ and a monopulse difference output $\Delta_{AZ}$, which are used to establish range to target and variance of target azimuth position from the beam center position, respectively.

The beamformer network $\Delta_{EL}$ ports for the two interleaved arrays are coupled to another hybrid tee 21 whose difference output is fed to a non-reflecting termination 22. The combined sum output $\Delta_{EL}$ is used to establish target elevation.

The procedures for using monopulse sum amplitude and difference error slope to determine target position is well known in this field. Also, many specific structures can be used for the hybrid tees and the column beam former networks, and are also well known.

An antenna employing the first embodiment is less suited to an edge-slotted array implementation because of the non-linear phase tapers as shown in FIG. 4. This requires a non-uniform slot spacing which is further complicated by the resulting changes in mutual coupling effects between slots.

While this invention has been described in terms of selected preferred embodiments, the invention is not limited to those embodiments. Rather, many modifications and variations would be possible without departing from the scope and spirit of this invention, as defined in the appended claims.

I claim:

1. A travelling wave antenna for monopulse operation, comprising:

an array of first elements having a first excitation function $f_o(x)$ of the form $$f_o(x)=f\Sigma(x)-f\Delta(x);$$

an array of second elements, interleaved with the first elements, and having a second excitation function $f_E(x)$ of the form $$f_E(x)=f\Sigma(x)+f\Delta(x);$$

and means for combining outputs from the first and second elements to provide a sum output and a difference output, wherein $f\Sigma(x)$ is a first real illumination function having no imaginary component, and is an even amplitude taper function of variable aperture x, wherein $f\Delta(x)$ is a second real illumination function having no imaginary component, and is an odd amplitude taper function of said variable aperture x, and wherein for a given value of said variable aperture x, $f\Sigma(x)$ and $f\Delta(x)$ are one of co-phasal and anti-phasal with each other.

2. A travelling wave antenna for monopulse operation as recited in claim 1, wherein said function $f\Sigma(x)$ is a Taylor amplitude taper function.

3. A travelling wave antenna for monopulse operation as recited in claim 1, wherein said function $f\Delta(x)$ is a Bayliss amplitude taper function.

4. A travelling wave antenna for monopulse operation as recited in claim 1, wherein said function $f\Sigma(x)$ is a Taylor amplitude taper, and said function $f\Delta(x)$ is a Bayliss amplitude taper function.

5. A travelling wave antenna for monopulse operation as recited in claim 1, additionally comprising a plurality of first and second phase shifters at respective said first and second feed ports of said first and second elements, said first and second phase shifters permitting monopulse beam scanning in a plane orthogonal to said first and second element arrays.

6. A travelling wave antenna for monopulse operation as recited in claim 1, additionally comprising means for feeding energy to both said first elements and said second elements simultaneously, and with energy radiating from said first elements and energy radiating from said second elements combining to form an illumination pencil beam of a predetermined beam width.

7. A travelling wave antenna for monopulse operation as recited in claim 5, additionally comprising means for feeding energy to both said first elements and said second elements simultaneously, and with energy radiating from said first elements and energy radiating from said second elements combining to form an illumination pencil beam of a predetermined beam width.

8. A travelling wave antenna for monopulse operation as recited in claim 5, wherein said function $f\Sigma(x)$ is a Taylor amplitude taper, and said function $f\Delta(x)$ is a Bayliss amplitude taper function.

9. A travelling wave antenna for monopulse operation as recited in claim 6, wherein said function $f\Sigma(x)$ is a Taylor amplitude taper, and said function $f\Delta(x)$ is a Bayliss amplitude taper function.

10. A travelling wave antenna for monopulse operation as recited in claim 7, wherein said function $f\Sigma(x)$ is a Taylor amplitude taper, and said function $f\Delta(x)$ is a Bayliss amplitude taper function.

11. A method of radar operation comprising the steps of: forming an array of first elements having a first excitation function $f_o(x)$ of the form $$f_o(x) = f\Sigma(x) - f\Delta(x);$$

forming an array of second elements interleaved with the first elements, and having a second excitation function $f_E(x)$ of the form $$f_E(x) = f\Sigma(x) + f\Delta(x);$$

and combining outputs from the first and second elements to provide a sum output and a difference output, wherein $f\Sigma(x)$ is a first real illumination function having no imaginary component, and is an even amplitude taper function of variable aperture x, wherein $f\Delta(x)$ is a second real illumination function having no imaginary component, and is an odd amplitude taper function of said variable aperture x, and wherein for a given value of said variable aperture x, $f\Sigma(x)$ and $f\Delta(x)$ are one of co-phasal and anti-phasal with each other.

12. The method recited in claim 11, wherein said function $f\Sigma(x)$ is a Taylor amplitude taper function.

13. The method recited in claim 11, wherein said function $f\Delta(x)$ is a Bayliss amplitude taper function.

14. The method recited in claim 11, wherein said function $f\Sigma(x)$ is a Taylor amplitude taper, and said function $f\Delta(x)$ is a Bayliss amplitude taper function.

15. The method as recited in claim 11, additionally comprising the step of phase shifting outputs of said first and second elements to permit monopulse beam scanning in a plane orthogonal to said first and second element arrays.

16. The method as recited in claim 11, additionally comprising the steps of feeding energy to both said first elements and said second elements simultaneously, and combining energy radiating from said first elements with energy radiating from said second elements to form an illumination pencil beam of a predetermined beam width.

17. The method as recited in claim 15, additionally comprising the steps of feeding energy to both said first elements and said second elements simultaneously, and combining energy radiating from said first elements with energy radiating from said second elements to form an illumination pencil beam of a predetermined beam width.

18. The method recited in claim 15, wherein said function $f\Sigma(x)$ is a Taylor amplitude taper, and said function $f\Delta(x)$ is a Bayliss amplitude taper function.

19. The method recited in claim 16, wherein said function $f\Sigma(x)$ is a Taylor amplitude taper, and said function $f\Delta(x)$ is a Bayliss amplitude taper function.

20. The method recited in claim 17, wherein said function $f\Sigma(x)$ is a Taylor amplitude taper, and said function $f_\Sigma(x)$ is a Bayliss amplitude taper function.

* * * * *